United States Patent [19]

Kobe et al.

[11] Patent Number: 5,643,648

[45] Date of Patent: Jul. 1, 1997

[54] PRESSURE SENSITIVE ADHESIVE PATCH

[75] Inventors: James J. Kobe, Newport; Gene R. Ward, New Brighton, both of Minn.

[73] Assignee: Minnesota Mining and Manufacturing Company, St. Paul, Minn.

[21] Appl. No.: 495,426

[22] PCT Filed: Jul. 26, 1995

[86] PCT No.: PCT/US95/09467

§ 371 Date: Jul. 26, 1995

§ 102(e) Date: Jul. 26, 1995

[51] Int. Cl.$^6$ ............................ B32B 7/12; B29C 73/10
[52] U.S. Cl. .................. 428/63; 152/367; 428/355 N; 156/94
[58] Field of Search ...................... 152/367; 428/63, 428/343, 355, 356; 156/94

[56] References Cited

U.S. PATENT DOCUMENTS

| | | | |
|---|---|---|---|
| Re. 24,906 | 12/1960 | Ulrich | 296/59 |
| 614,287 | 11/1898 | Call | |
| 1,478,576 | 12/1923 | Morton et al. | |
| 2,358,195 | 9/1944 | Wilkinson et al. | 260/775 |
| 2,467,322 | 4/1949 | Lightbown et al. | 154/139 |
| 2,560,040 | 7/1951 | Whipple | 152/367 X |
| 2,803,283 | 8/1957 | Gruber | 152/357 |
| 2,833,327 | 5/1958 | Boyce | 152/367 |
| 2,943,969 | 7/1960 | Boyer et al. | 154/110 |
| 3,101,764 | 8/1963 | Gruber | 152/367 |
| 3,133,585 | 5/1964 | Iknayan | 152/367 |
| 3,133,586 | 5/1964 | Wolfe | 152/367 |
| 3,172,446 | 3/1965 | Gruber | 152/370 |
| 3,239,478 | 3/1966 | Harlan, Jr. | 260/27 |
| 3,294,144 | 12/1966 | Anderson | 152/367 |
| 3,369,586 | 2/1968 | Gottauf | 152/367 |
| 3,551,391 | 12/1970 | Crocker et al. | 260/78.5 |
| 3,730,247 | 5/1973 | White | 152/367 |
| 3,850,718 | 11/1974 | Trapani | 156/94 |
| 3,897,295 | 7/1975 | Dowbenko et al. | 156/272 |

(List continued on next page.)

FOREIGN PATENT DOCUMENTS

| | | |
|---|---|---|
| 8603587 | 3/1988 | Brazil . |
| 0405798 | 1/1991 | European Pat. Off. . |
| 0457566 | 11/1991 | European Pat. Off. . |
| 2452393 | 11/1980 | France . |
| 4000228 | 7/1991 | Germany . |
| 61-115980 | 6/1986 | Japan . |
| 89-104641 | 4/1989 | Japan . |
| 06234965 | 8/1994 | Japan . |
| 953509 | 3/1964 | United Kingdom . |

OTHER PUBLICATIONS

*Handbook of Pressure Sensitive Adhesive Technology*, Donatas Satas, Ed., Van Nostrand Reinhold, New York (1989), pp. 585–587, 691–693, 750–754.
*Handbook of Adhesives*, Third Ed., Irving Skeist, Ed., Van Norstrand Reinhold, New York (1990), pp. 533–534.
Lai, "Park's Tire Tools," *Bicycle Guide*, p. 16 (Oct. 1994).
"Park Glueless Patch vs. Speed Patch," *Bicycling*, p. 32 (undated).
Sample "A," Unidentified Patch.
Sample "B," LEECH PATCH.
Sample "C," Quick Fix Glueless Tube Patch.
Sample "D," Colorado Off–Road Point Series Speed Patch.
Sample "E," Rema Tip Top Bike Tube Patch.
Sample "G," Speed Patch.

*Primary Examiner*—Daniel Zirker
*Attorney, Agent, or Firm*—Gary L. Griswold; Walter N. Kirn

[57] ABSTRACT

A patch is provided for repairing articles such as bicycle tire inner tubes. The patch includes a backing; and a pressure sensitive adhesive layer having an average thickness of greater than about 0.076 mm disposed on the backing. The patch has a maximum thickness of no greater than about 0.64 mm, a T-Peel strength from an organic polymeric substrate of greater than about 0.18 kN/m after 1 hour dwell time at 22° C., and a static shear strength of at least about 50 minutes from stainless steel at 70° C. with a 7.6 kPa load.

15 Claims, 1 Drawing Sheet

U.S. PATENT DOCUMENTS

| | | | |
|---|---|---|---|
| 3,913,734 | 10/1975 | Siegel | 206/498 |
| 4,143,767 | 3/1979 | MacDonald | 206/582 |
| 4,181,752 | 1/1980 | Martens et al. | 427/54.1 |
| 4,223,067 | 9/1980 | Levens | 428/308 |
| 4,284,450 | 8/1981 | Duttlinger | 156/97 |
| 4,284,451 | 8/1981 | Conley | 156/97 |
| 4,375,231 | 3/1983 | Bubik et al. | 152/370 |
| 4,444,953 | 4/1984 | St. Clair | 525/98 |
| 4,502,355 | 3/1985 | Squyres | 81/15.2 |
| 4,602,971 | 7/1986 | Bergeron et al. | 428/63 X |
| 4,618,519 | 10/1986 | Koch et al. | 428/63 |
| 4,629,663 | 12/1986 | Brown et al. | 428/343 |
| 4,696,332 | 9/1987 | Koch | 152/367 |
| 4,732,196 | 3/1988 | Koch et al. | 152/367 |
| 4,732,633 | 3/1988 | Pokorny | 428/63 X |
| 4,756,337 | 7/1988 | Settineri | 138/99 |
| 4,765,852 | 8/1988 | Koch et al. | 156/97 |
| 4,780,367 | 10/1988 | Lau et al. | 428/355 |
| 4,833,179 | 5/1989 | Young et al. | 522/183 |
| 4,946,742 | 8/1990 | Landin | 428/354 |
| 4,959,251 | 9/1990 | Owens et al. | 428/63 X |
| 5,342,685 | 8/1994 | Gobran | 428/355 |
| 5,354,597 | 10/1994 | Capik et al. | 428/152 |

PRESSURE SENSITIVE ADHESIVE PATCH

FIELD OF THE INVENTION

The present invention relates to repair patches, particularly pressure sensitive repair patches for inflatable articles such as bicycle inner tubes, beach toys, personal flotation devices, and the like.

BACKGROUND OF THE INVENTION

There are currently two patching technologies for repairing tiny holes or punctures in inflatable articles such as bicycle inner tubes. One consists of a wet, i.e., solvent-based, adhesive patch technology. The other consists of a pressure sensitive adhesive patch technology. Although damaged bicycle inner tubes are typically patched in European countries, in the United States it is usually considered to be more cost effective and efficient to replace the inner tube rather than to patch it. This is particularly true when compared to using wet adhesive patch technology. Therefore, many cyclists in the United States carry a spare inner tube when touring. Pressure sensitive adhesive (PSA) patch technology has recently emerged as a replacement for wet adhesive patch technology; however, there are problems with current PSA patches that has limited their usefulness. For example, current PSA patches are not considered a long-term "fix." That is, air in an article such as an inner tube with a hole patched with a PSA patch can quickly leak, sometimes over a 24-hour period.

The solvent-based adhesive patching system typically consists of a relatively thick patch typically about 1.3 mm and a container of a solvent-based adhesive. This system is used to repair an inner tube by first cleaning and/or abrading the punctured area, applying the solvent-based adhesive, allowing the solvent to evaporate, applying the patch, and waiting 15–20 minutes before pressurizing the inner tube. The patch is typically made from a rubber such as neoprene rubber. A similar system includes a two-layer patch having a main body of vulcanized rubber and a thin layer of nonvulcanized rubber adhered thereto, and a container of a vulcanizing fluid or "cement." The "adhesive" is formed when the layer of nonvulcanized rubber is contacted with the vulcanizing fluid that reacts with the uncombined sulfur to fully cure the rubber. These patching systems are both inconvenient and time consuming, and can be user sensitive. Another problem with the solvent-based patching system is that the solvent can evaporate once the container has been opened leaving a useless container of dried adhesive.

The pressure sensitive patching system typically consists of a single-sided pressure sensitive patch that can be approximately 0.75–1.5 mm thick. Typically, such patches have a thick backing and a thin layer of pressure sensitive adhesive disposed on one side of the backing. The backings are typically at least about 0.75 mm thick and the adhesive layers are typically about 0.05 mm thick. The backings are typically made of opaque polyethylene foam or thick neoprene rubber. The adhesives are typically rubber-based or acrylic pressure sensitive adhesives. The thick patch is applied over a hole in an inner tube, for example, after abrading or cleaning the punctured area to remove talc or other powder from the inner tube. Because this patch is pressure sensitive, it overcomes the inconvenience and time consuming weaknesses of the solvent-based adhesive patch system. Current single-sided pressure sensitive patches can be user sensitive because of the pressure sensitive adhesive performance properties.

Furthermore, such patches are not generally useful for all types of bicycles, e.g., mountain bikes and touring bikes. Because touring bike tires are inflated to a higher pressure than mountain bike tires, more aggressive adhesives are needed for patching mountain bike tubes. That is, lower pressure mountain bike inner tubes require an adhesive with better peel and shear strength because of the lower amount of assistance to hold the patch in place from the pressure caused by contact between the tube and the tire.

Many patches for repairing bicycle inner tubes have beveled or feathered edges. This provides a patch with an extremely thin peripheral lip that resists distortion or deformation and lifting under conditions of stress. The centers of such patches are typically at least about 1.0 mm thick. However, such patches are only effective and desirable on tubes where the overall thickness does not affect the ride or wear of the tire, as a thick patch can bulge the tire causing premature localized wear. Although thin (e.g., about 0.05–0.13 mm) vinyl repair patches are available, they typically also have a very thin layer of an adhesive, which can have poor peel strength.

Thus, there is a need for an improved pressure sensitive adhesive patch. Particularly, there is a need in the bicycle industry for an improved pressure sensitive inner tube patch that can be easily applied in the field. Most inner tube patches on the market are either complicated, inconvenient, or only effective on certain types of tubes. Furthermore, they are not considered a long-term fix. A simpler, faster, more convenient, and effective patch that can function on touring bikes, mountain bikes, or both, for a longer period of time, is desired.

SUMMARY OF THE INVENTION

The present invention provides a patch that includes a backing and a pressure sensitive adhesive layer having an average thickness of greater than about 0.076 mm disposed on the backing. The patch has a maximum thickness of no greater than about 0.64 mm, a T-Peel strength from an organic polymeric substrate of at least about 0.18 kN/m steer 1 hour dwell time at 22° C., and a static shear strength of at least about 50 minutes from stainless steel at 70° C. with a 7.6 kPa load. The patch can be used on a wide variety of articles that need a defect, such as a hole or puncture, repaired. The patch is particularly useful for patching inflatable articles such as bicycle inner tubes, beach toys, personal flotation devices, beds, boats, air mattresses, balloons, the amusement park entertainment device referred to as the "moon walk," and other inflatable amusement devices. Thus, the present invention also provides a hollow inflatable article having the patch described above adhered thereto.

The present invention also provides a kit for repairing an article, particularly an inflatable article such as a bicycle inner tube. The kit includes the patch described above; surface preparation means; and instructions for applying the patch to an article to be repaired. The surface preparation means can be an abrasive material, a solvent-soaked pad such as an alcohol-soaked pad, or the like.

Finally, the present invention provides a method of repairing an article. The method includes the step of applying the patch described above over a defect, e.g., hole, in the wall of the article.

DETAILED DESCRIPTION OF THE INVENTION

Figure 1:
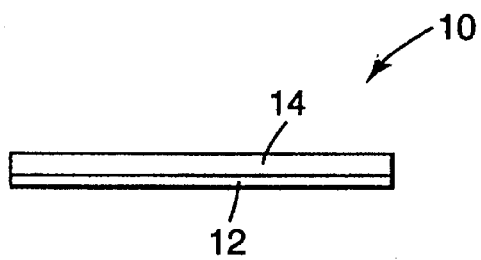
FIG. 1 is a side view of a patch of the invention.

The present invention provides a patch, a kit, and a method for repairing a variety of organic polymeric articles, such as rubber or plastic articles. The patch and kit are particularly suitable for patching inflatable articles, such as inner tubes for bicycle and tractor tires, rubber balls, water toys, boats, air mattresses, balloons, personal flotation devices, the amusement park entertainment device commonly referred to as the "moon walk", and other inflatable vinyl or rubber items, for example. It will be appreciated, however, that the invention is applicable to any type of article that needs to be repaired to keep air or water, for example, from passing through a defect in the wall of the article.

The adhesive for applying the patch to an article is a pressure sensitive adhesive. It is disposed on one surface of a backing. Thus, the patch does not require the user to apply glue. Therefore, the patch of the present invention can be easily applied to an article to repair a defect such as a hole or puncture. It is a simple, fast, and convenient method of repairing a bicycle inner tube, for example. The patch of the present invention is generally less sensitive to "user error" than are conventional pressure sensitive adhesive patches. Reduced user error or user sensitivity typically results, for example, if the patch has good adhesion substantially immediately upon application.

The patch of the present invention is particularly advantageous because it is very thin, compared to most conventional patches. This contributes to reduced user sensitivity as thin patches have less of a tendency to slip. It has a maximum thickness of no greater than about 0.64 mm, preferably no greater than about 0.50 mm, more preferably no greater than about 0.40 mm, and most preferably no greater than about 0.30 mm. This thin profile decreases the amount of wear a tire experiences in the area of the patch. Although it is desirable for the patch to have a substantially uniform profile, it can be thicker in the center and thinner at the periphery if desired. At no point along the profile, however, is the patch thicker than about 0.64 mm. This is particularly desirable for patching bicycle tire inner tubes to reduce the amount of localized wear on the tire.

The patch of the present invention is also particularly advantageous because it adheres well under both high and low temperature conditions (e.g., −18° C. to 70° C.). Low temperature adhesion is typically important in the application step of the patch, whereas high temperature adhesion is important during use of the patched article to avoid slippage of the patch. Patches can be warmed by hand during application if the temperature is below about 4° C.

To obtain a very thin patch that adheres well, a balance must be maintained between the thickness of the backing and the thickness of the pressure sensitive adhesive layer. To do this, the patch of the present invention uses a thinner backing coupled with a thicker layer of adhesive than commercially available PSA patches. The backing preferably has a maximum thickness of no greater than about 0.40 mm, more preferably no greater than about 0.30 mm, and most preferably no greater than about 0.10 mm. The backing generally serves as simply a carrier for the adhesive when the patch is held in place by externally applied pressure, i.e., when it is constrained. However, when the patch is unconstrained, the backing thickness is more important to the performance of the patch. Thus, it can be extremely thin as long as it can be handled without tearing or wearing while inside the tire. Preferably, the backing has a thickness of at least about 0.01 mm, more preferably at least about 0.03 mm, and most preferably at least about 0.05 mm. Again, this is particularly desirable for patching bicycle tire inner tubes to reduce the amount of localized wear on the tire.

The pressure sensitive adhesive layer preferably has a thickness (average) of greater than about 0.076 mm, more preferably at least about 0.089 mm, and most preferably at least about 0.10 mm. Typically, a relatively thick layer of a pressure sensitive adhesive is needed for high peel strength; however, the thicker the layer of adhesive, the lower the shear strength. Thus, the thickness of the adhesive layer is chosen to balance the peel and shear strength values. Preferably, the adhesive layer is no greater than about 0.40 mm thick, and more preferably, no greater than about 0.30 mm thick. A thick layer of adhesive has advantages over a thin layer having the same adhesive performance properties because it generally will conform and seal better to a substrate.

The patch of the present invention has a T-Peel strength of greater than about 0.18 kN/m from an organic polymeric substrate after 1 hour dwell time at 22° C., and a static shear strength of at least about 50 minutes from stainless steel at 70° C. with a 7.6 kPa load. Preferably, the patch has a T-Peel strength from an organic polymeric substrate of at least about 0.26 kN/m after 1 hour dwell time at 22° C., and a static shear strength of at least about 100 minutes from stainless steel at 70° C. with a 7.6 kPa load. More preferably, the patch has a T-Peel strength from an organic polymeric substrate of at least about 0.35 kN/m after 1 hour dwell time at 22° C., and a static shear strength of at least about 300 minutes on stainless steel at 70° C. with a 7.6 kPa load. This T-Peel test is an unconstrained test. As used herein, the term "unconstrained" means that the patch is not held in place by externally applied pressure, and the term "dwell time" means the period of time the patch is in contact with the substrate before being tested. The peel strengths listed above result from the appropriate choice of adhesive for the desired substrate. Preferably, these peel strengths are those obtained using an adhesive on a butyl rubber substrate, such as is used in inner tubes.

The patches of the present invention can typically withstand pressures in an unconstrained mode of up to about 70 kPa whereas in a constrained mode, such as when used on an inner tube in a bicycle tire, the patches of the present invention can withstand pressures of up to about 825 kPa. Typically, touring bicycle tires experience pressures of about 690–825 kPa. and mountain bicycle tires experience pressures of about 275–415 kPa.

Backing

The backing is typically made from a material and in a manner that is generally impervious to the adhesive. If, however, the adhesive is not impervious to air, for example, the backing should be made of a material that it is generally impervious to air to avoid leakage from a patched inflated article. The backing can be elastic or nonelastic. Preferably, it is elastic. It is also preferably flexible. An elastic and flexible backing make the patch of the present invention particularly useful for patching bicycle inner tubes. This is because the patch stretches as the inner tube stretches. For particular advantage during application of the patch, the backing is preferably of a material that is sufficiently transparent that a hole in an inner tube can be seen through the patch.

The backing can be made from a wide variety of materials including organic polymers, thin metals, ceramic materials, fiberglass, etc. The backing can be a single layer or a composite of two or more layers of material. The composite can include metallized layers, barrier layers, nonwoven layers, polymer layers, paper layers, antistatic layers, primer layers, foam layers, and the like. Preferably, the patch of the present invention includes a backing made from an elastic polymeric material. This is particularly important when the patch is used in an expandable unconstrained application.

The elastic polymeric material can be any material that can be stretched and then return towards its original shape and size. Preferably, the elastic polymeric material has a recovery of at least about 50% after being elongated to 100% of its, original length. More preferably, it has a recovery of at least about 65%, and most preferably at least about 80%, when elongated to 100% of its original length. For particularly desirable results, the choice of material of the backing is matched to the material of the substrate such that their percent recoveries are substantially (i.e., within about 20%) similar. This generally avoids puckering and gapping of the patch when the article is deflated. This percent recovery can be determined by the test method described below for Percent Recovery. In this test, a sample of the material is elongated 100% of its original length, held under tension for two minutes, and then allowed to relax for two minutes prior to the determination of the amount of recovery. For an inflatable article, this allows for expansion upon inflation.

The elastic polymeric material is also preferably flexible. That is, a 0.4 mm thick backing material is preferably capable of being bent to a radius of about 0.5 cm at room temperature (20°–25° C.) without breaking. A flexible material is desirable so that the patch can conform to the article being patched. The elastic, preferably flexible, polymeric material can be in the form of a single layer, multiple layers, or a foam. Polymers that can be used to prepare the elastic material include polyolefins and polyolefin copolymers such as low density polyethylene, ultra low density polyethylene, low density polyethylene, polyethylene/polypropylene, and polyethylene/polybutylene; polyurethane; polyester; thermoplastic rubber such as ABA block copolymers; plasticized polyvinyl chloride; blends of vinyl acetate and elastomers; and combinations thereof. Mixtures or blends of any plastic or plastic and elastic materials such as polypropylene/polyethylene, polyurethane/polyolefin, polyurethane/polycarbonate, polyurethane/polyester, and the like, can also be used. Laminate materials such as those described in U.S. Pat. No. 5,354,597 (Capik et al.) can also be used as the elastic polymeric material as long as they recover towards their original shape upon elongation, preferably as long as they have a percent recovery of at least about 50%, more preferably at least about 65%, and most preferably at least about 80%, when elongated by 100%. Such materials may require prestretching to achieve the desired level of elasticity. Preferred materials are thermoplastic rubbers such as KRATON G2712X and KRATON G7705, both of which are commercially available from Shell Chemical Co., Houston, Tex.; low density polyethylene (LDPE) such as Polyethylene 2503.1, which is commercially available from Dow Chemical Co., Midland, Mich., as well as PETROTHENE NA 964-085 and the PETROTHENE NA 960 series, all of which are commercially available from Quantum Chemical Corp., Cincinnati, Ohio; and ultra low density polyethylene (ULDPE).

The backing can be made using any of the several methods of film forming known in the art such as extrusion, coextrusion, solvent casting, and the like. As discussed above, the backing can be of any thickness so long as the overall patch thickness is no greater than about 0.64 mm, and the layer of adhesive is sufficiently thick to provide the desired levels of peel and shear strength. A thin backing is preferred, but it should be thick enough to provide adequate tensile strength for a particular application and processing method. For example, when the backing is processed, it should be able to withstand the tension produced without tearing.

The thickness of the backing should also be considered as it relates to the recovery force exerted by the material upon being stretched. The recovery force is the force exerted by an elongated strip of material to return to its natural state. The Peak Load test provided below is a measurement of the maximum recovery force exhibited by a strip of material elongated to 100% of its original state. In general, the recovery force increases relative to the thickness of the material. As a result, the thickness of the material may be selected to provide an appropriate level of recovery force. It is desirable that the recovery force remaining upon bond formation and partial recovery of the elastic material be low to prevent failure of the bond. High recovery forces can cause premature peel mode failures in expandable unconstrained applications and shear mode failure in constrained applications. The material and thickness of the backing are chosen such that the peak load recovery force measured at 100% elongation is less than the strength of the bond formed between the patch and the article to prevent failure in the peel and/or shear mode. Preferably, the recovery force of a backing material is less than about 2.5 kN/m, more preferably less than about 1.8 kN/m, and most preferably less than about 0.9 kN/m. Particularly preferred patches of the present invention include a backing having a recovery force of less than about 0.18 kN/m.

The recovery force appears to be directly proportional to the thickness of the backing, at least for some materials, To exemplify this, the Peak Load was measured for a material made from PETROTHENE NA 964-085 with 4 wt-% REMAFIN Blue AEW U-18 colorant for three different thicknesses (0.073 mm, 0.58 kg/cm; 0.095 mm, 0.83 kg/cm; 0.12 mm, 1.00 kg/cm). The Peak Load per unit length increased proportionately with the material thickness, so that the Peak Load per unit area remained relatively constant (170 kg/cm$^2$, 190 kg/cm$^2$, and 180 kg/cm$^2$, respectively). Thus, a suitable material thickness may be selected to provide a recovery force that is appropriate for a particular application based on adhesive performance.

The backing can contain additives such as colorants, antioxidants, antistatic agents, fillers, particulates, and the like. Ideally, no colorants, fillers, or particulates are incorporated into the backing, particularly if they produce an opaque patch; antioxidants are generally desirable, however. A patch that is sufficiently transparent or clear to see the hole and adhesive wet out is desirable for easy center placement over a hole. Furthermore, additives such as fillers can reduce the elasticity of the backing. Thus, if used, the additives are used in an amount such that they do not substantially affect the bond performance or elastic properties of the patch. Examples of colorants (e.g., pigments and dyes) include REMAFIN Blue AEW U-18, which is commercially available from Resco Colors, a subsidiary of Hoechst Canada Inc., Mississauga, Ontario, and No. 16180 Dark Blue Color Concentrate, which is commercially available from Ampacet, Tarrytown, N.Y. Examples of antioxidants include IRGANOX 1520 and IRGANOX 1010, both of which are commercially available from Ciba Geigy, Mcintosh, Tex. Examples of fillers include calcium carbonate, carbon black, glass beads, polymeric and glass bubbles, short fibers of glass or nylon, silica, magnesium oxide, and talc. Examples of particulates include thermally conductive particulates and microwave susceptors. When used, each additive is preferably present in an amount less than about 20 percent by weight (wt-%), based on the total weight of the backing material. More preferably, when used antioxidants are present in an amount of less than about 2 wt-%, and colorants are present in an amount of less than about 10 wt-%.

Pressure Sensitive Adhesive

Pressure sensitive adhesives are a standard class of materials. They have a four-fold balance of adhesion, cohesion, stretchiness, and elasticity. They have an open time tack (i.e., period of time during which the adhesive is tacky at room temperature (i.e., about 20°–25° C.)) on the order of days and often months or years and firmly adhere to a variety of dissimilar surfaces upon contact. They require no activation by water, solvent, or heat in order to exert a strong adhesive holding force toward such materials as paper, cellophane, glass, plastic, wood, and metals. Typically, pressure sensitive adhesives have a sufficient cohesive strength and elastic properties such that, despite their aggressive tackiness, they can be handled with the fingers and removed from smooth surfaces without leaving a substantial residue. A variety of materials and compositions useful as pressure sensitive adhesives are available commercially and are thoroughly discussed in the literature. See, for example, U.S. Pat. Nos. Re. 24,906; 3,551,391; 3,239,478; 3,897,295; 4,181,752; 4,223,067; 4,629,663; 4,780,367; and 4,833,179.

Pressure sensitive adhesives suitable for use in this invention are coatable adhesives. A wide variety of coatable pressure sensitive adhesives can be used, such as solvent coatable, hot melt coatable, as well as latex PSA's that are coatable out of water. Also, solventless curable adhesives (often referred to as 100% solids) can be used. Where thicker adhesive coatings are desired, it may be desirable either to apply multiple layers of the adhesive, hot melt coat, or to photopolymerize the adhesive in situ. Specific examples of pressure sensitive adhesives include acrylates, such as isooctyl acrylate/acrylic acid copolymers, tackified acrylates, and plasticizer-containing acrylates such as those disclosed in U.S. Pat. No. 4,946,742 (Landin); natural or synthetic rubber resins, including thermoset rubbers as well as thermoplastic rubbers and elastomers, such as nitrile rubbers (e.g., acrylonitrile-butadiene), styrene-butadiene, styrene-isoprene, styrene-butadiene-styrene, styrene-isoprene-styrene, and natural rubber; silicone-based adhesives, such as polysiloxanes; polyolefins; polyesters; polyamides; and polyurethanes.

The pressure sensitive adhesive suitable for use in the present invention can be any desired adhesive that is capable of adhering to the article to be repaired. Thus, the specific composition of the pressure sensitive adhesive is irrelevant to the present invention as long as the PSA meets the other characteristics described herein. Preferably, it is an adhesive that will adhere to the materials used to prepare inflatable articles, such as vinyls, butyl rubber, neoprene, and the like. One of skill in the art can typically match the adhesive to the substrate for effective adhesion. For example, the rubber resins and tackified acrylates can be used on butyl rubber and the plasticizer-containing acrylates can be used on vinyls.

A preferred class of pressure sensitive adhesives are the diblock A-B type and triblock A-B-A or A-B-C type block copolymers, or mixtures thereof, such as those referred to under the tradename KRATON of Shell Oil Company. These are polymer blocks wherein A is a thermoplastic polymer block with a glass transition temperature above room temperature and which is relatively incompatible with the elastomeric B segment. B and C are typically polymer blocks of a conjugated diene such as butadiene or isoprene. While the conjugated diene employed in the B block may differ from that employed in the C block, it is preferred that the same diene be employed in both blocks. These blocks may be partially or completely hydrogenated. Examples of such diblock and triblock copolymers are disclosed in U.S. Pat. Nos. 4,444,953 and 3,239,478.

A particularly preferred pressure sensitive adhesive comprises an elastomeric phase which is predominantly of diblock A-B type block copolymers wherein the A blocks are of a monoalkenyl aromatic hydrocarbon or a monoalkenyl arene, mainly polystyrene or polystyrene derivatives, having a weight average molecular weight of about 4,000–50,000, preferably about 7,000–30,000, and the B blocks are predominantly 1,3-butadiene. The A block content is about 7–50 wt-% of the block copolymer, preferably about 10–35 wt-%. The A block can also be formed predominately of alpha-methylstyrene, t-butylstyrene, and other ring alkylated styrenes, and can also contain minor proportions of other monomers, such as conjugated dienes. The B groups have a weight average molecular weight of about 5,000–500,000, preferably about 50,000–300,000. Minor proportions of other monomers can be included in the B blocks, e.g., residue arenes or other conjugated dienes. B groups can also contain conjugated dienes other than 1,3-butadiene in mounts up to about 50% by weight of the total B blocks. Other A-B type block copolymer elastomers or other conventional elastomers, preferably diene elastomers, can be employed in amounts up to about 75 wt-% (preferably up to about 50 wt-%) of the multiblock portion of the elastomeric phase.

The remaining portion of the elastomeric phase comprises multiblock A-B, linear (other than diblock), star, radial, or otherwise branched, type block copolymer of the above-described A blocks, and B blocks of conjugated dienes, preferably, 1,3-butadiene. This multiblock A-B type block copolymer has there or more blocks, the terminal portion of at least two branches or ends are preferably of A blocks. Preferably, this portion of the elastomeric phase comprises a linear triblock A-B type block copolymer.

A specific embodiment of this pressure sensitive adhesive is one that includes 100 parts of an elastomeric phase containing about 78–98 parts (preferably about 80–95 parts) of an elastomeric diblock A-B type block copolymer of predominately monoalkenyl arene (preferably polystyrene or polystyrene derivatives) A blocks, and poly-1,3-butadiene B blocks. The elastomeric phase also contains about 2–22 parts of a multiblock elastomer portion of the elastomeric phase comprising an A-B type block copolymer of at least 3 blocks, wherein the B block is predominantly 1,3-butadiene and the A block is predominantly a monoalkenyl arene. The elastomeric phase is tackified with a solid tackifying resin (preferably about 80–140 parts per 100 parts elastomeric phase) and an oil or liquid tackifier (preferably about 5–35 parts per 100 parts elastomeric phase) to provide an adhesive having a composite midblock glass transition temperature (CMTg) of less than about −10° C. This type of pressure sensitive adhesive is disclosed in U.S. Pat. No. 5,342,685 (Gobran). Other similar types of block copolymer adhesives are commercially available from H.B. Fuller Company, St. Paul, Minn.

Patch and Kit

Figure 2:
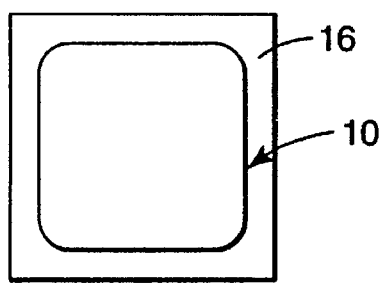
FIG. 2 is a plan view of the patch shown in FIG. 1, partially cut away, disposed on a release liner.

Referring to patch 10 shown in FIGS. 1 and 2, a layer of pressure sensitive adhesive 12 is disposed directly on one surface of a backing 14. Advantageously, no primer layer or priming method are necessary to adhere the pressure sensitive adhesive layer 12 to the backing 14, although this could be done if desired for certain combinations of adhesive and backing material. For storage, a release liner 16 is disposed on the exposed surface 15 of the layer of pressure sensitive adhesive 12.

Figure 3:
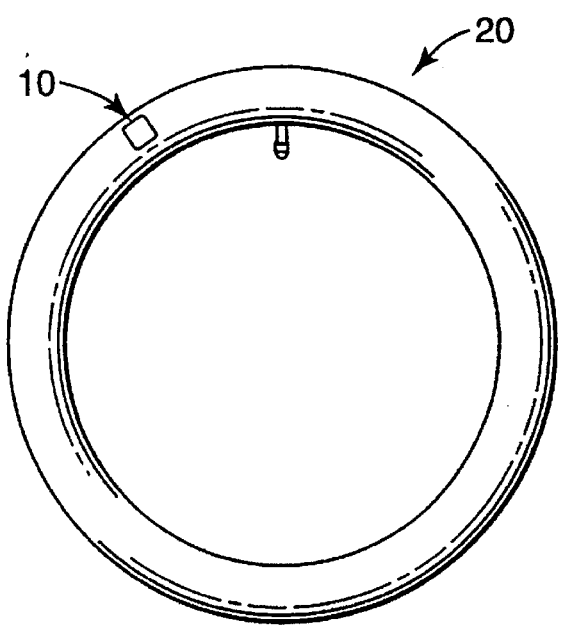
FIG. 3 is a bicycle inner tube with the patch of FIG. 1 adhered thereto.

To repair a damaged article, the patch 10 is removed from the release liner 16 and the exposed surface 15 of the pressure sensitive adhesive layer is applied to a defect in the article, e.g., a puncture in a bicycle tire inner tube 20 shown in FIG. 3. Little preparation of the surface of the article is required prior to placement of the patch. For a bicycle tube, for example, the surface can be slightly abraded with a piece of abrading material, cleaned with a solvent, or simply wiped with a dry cloth. Advantageously, preferred patches of the present invention are sufficiently transparent for easy placement of the patch over the defect in the article to be repaired. Furthermore, such clear patches allow the user to see the wet out of the relatively thick layer of adhesive over the abraded or cleaned surface.

As stated above, the patches of the present invention may also include a release liner to protect the pressure sensitive adhesive during storage or to permit the patches to be formed into a roll or pad. Release liners also prevent unintended contact of the adhesive with other surfaces. Release liners are prepared from release coatings, such as silicone release coatings, deposited on a substrate. One of the most common substrate is supercalendared kraft paper. Other suitable substrates include coated papers such as polyethylene coated kraft paper, clay coated kraft paper, and glassine paper; and non-porous films such as polyethylene, polypropylene, polyester, and polyethylene terephthalate. Useful release coatings can be prepared from any polymer of lower critical surface tension and of different polarity than that of the adhesive. Examples of useful polymers include silicones, fluorine-containing polymers, and long alkyl chain branched polymers.

The patch of the present invention can be prepared by well known techniques in the art of tape manufacturing. For example, a layer of the adhesive can be applied to the backing material by hot melt coating, solvent coating, extruding, or laminating. This can then be applied to a release liner. Alternatively, the adhesive can be applied to the release liner and then the adhesive-coated release liner can be combined with the backing by laminating. Individual patches can cut in any of a variety of sizes and shapes, such as squares, rectangles, circles, ovals, and the like. If they are cut into squares or rectangles, the corners should be slightly rounded to avoid a site to easily detach the patch from the repaired article.

The patch of the present invention is preferably included within a kit containing one or more patches disposed on a release liner. The kit further includes surface preparation means, and instructions for repairing an article by applying the patch over a defect in the article, e.g., a hole in the wall of a bicycle inner tube. The surface preparation means can be anything appropriate for the desired application. For example, it can be a small piece of a coated abrasive material for preparing the surface of the article. It can be a solvent, e.g., alcohol soaked, pad or cloth. Alternatively, it can be simply a small piece of dry cloth. The abrasive material and dry cloth are preferred because they can be used repeatedly and will not dry out. The dry cloth is more preferred because channels are not formed in the surface of the article through which air could pass if the patch does not conform to the channels. However, if used with light pressure, an abrasive material will not typically form such channels.

Reasonable modifications and variations are possible from the foregoing disclosure without departing from either the spirit or scope of the present invention as defined by the claims. Objects and advantages of this invention are illustrated by the following examples, which are meant to be nonlimiting illustrations of the invention. In the examples, all percentages or parts are by weight unless otherwise noted.

Test Methods

The following test methods were used to measure the various test results reported in the examples.

Percent Recovery and Peak Load Test

This test was performed on a strip of backing alone as well as the composite patch of the invention as shown in FIG. 1. This test indicates the elastic response of the strip or patch. Elastic response is the ability of the sample to recover after being elongated. This test also measures the peak load recovery force the strip or patch is able to sustain after being elongated 100%. This is an indication of the internal strength of the strip and the composite patch. The test procedure was as follows:

Samples were slit in the down web direction (as opposed from cross web) to a width of 1.3 cm and a length of 20 cm. Samples were marked in the middle with two lines that were 2.5 cm apart. The two lines were perpendicular to the lengthwise dimension of the sample. This distance was L1 and denotes the "test area." Samples were tested using an INSTRON tensile tester (commercially available from Instron Corp., Canton, Mass.) with the distance between the jaws set at 5 cm. The sample was clamped in the jaws so that the test area was centered between the upper and lower jaws and elongated in the lengthwise (or machine direction) until the jaws of the INSTRON tensile tester increased the gap by 5 cm, i.e., 100% elongation, at a crosshead speed of about 30 cm/minute. The INSTRON tensile tester was stopped at this point and the test sample was held in tension for two minutes. After the two-minute holding period, the tension was removed and the sample was allowed to relax for two minutes. Then the distance between the two lines was remeasured to give stretched length, L2. The Percent Recovery was determined by the following equation:

$$\% \text{ Recovery} = 100 - \left( \frac{(L2 - L1) \times 100}{L1} \right)$$

The Percent Recovery was the average of three replicate samples unless otherwise noted. For applications in which the patch must be elastic to conform to the article upon inflation, the desired percent recovery of the backing alone is preferably at least about 50%, more preferably at least about 65%, and most preferably at least about 80%. The desired percent recovery of the patch is preferably at least about 50%, more preferably at least about 65%, and most preferably at least about 80%.

The Peak Load was determined by finding the maximum force value exhibited by a sample during an elongation of 100%. This value was obtained from a recording chart in pounds. This value was then converted to kilograms and divided by the width of the sample to give the Peak Load in kilograms/centimeters (kg/cm). The reported Peak Load was the average of three replicate samples unless otherwise noted.

90° Peel Strength

This test was run according to PSTC-5. Test samples (2.5 cm×15 cm) included a pressure sensitive adhesive layer on a 0.05 mm thick primed polyester strip. Alternatively, commercially available samples were used as is; variations in width were compensated for in the calculations. These were applied to a stainless steel panel or low density polyethylene panel using two passes of a 2 kg hard-rubber roller, one pass in each direction at a rate of about 30 cm/minute. Samples were allowed to dwell for one hour at room temperature (20°–25° C.) before being separated at a rate of about 30 cm./minute. Two replicates were run and the average value reported.

T-Peel Strength

A test sample of a pressure sensitive adhesive coated on 0.05 mm thick piece of primed polyester film having the dimensions of 1.3 cm×15 cm were tested. Alternatively, commercially available samples were used as is; variations in width were compensated for in the calculations. Each sample was attached to a 1.6 cm×15 cm piece of a bicycle inner tube (made from a material containing butyl rubber, SPECIALIZED Product No. 031-1333 24×1.5/2.125, made by Specialized, Taiwan. The piece of inner tube was cleaned with methyl ethyl ketone to remove any surface contamination. Each test sample was aligned on top of the inner tube and then pressed together using two passes of a 2 kg hard rubber roller, the roller traveling in opposite directions for each pass at a rate of about 30 cm/minute. The test sample was allowed a one-hour dwell at room temperature. The two immediately adjacent free ends of the sample and inner tube were clamped in the jaws of an INSTRON tensile tester and pulled apart at a crosshead speed of about 30 cm/minute. The T-Peel Strength value was reported as the average value over a 2.5–5.0 cm length of test sample. Two replicates were run and the average value reported in kilonewtons/meter (kN/m). This test is an indication of how well an adhesive bonds to a flexible substrate, such as a bicycle inner tube.

Static Shear Strength

Static shear strength at 70° C. was determined as follows: Individual 2.5 cm×10 cm test samples having a layer of pressure sensitive adhesive on a 0.05 mm thick primed polyester film were bonded to a 5 cm×13 cm stainless steel panel by passing a 2 kg rubber coated steel roller over the composite two times to form an overlap area of 2.5 cm. Alternatively, commercially available samples were used as is; variations in width were compensated for in the calculations. If sample width was less than 2.5 cm wide, then the length was adjusted for a total 6.5 cm$^2$ overlap area. After about 1–24 hours dwell at room temperature (e.g., 20°–25° C.), the bonded panel was clamped 2° from vertical in an oven maintained at 70° C. with a 500 gram weight attached to the free end of the composite. The time to failure was determined in minutes and was the average value of three replicates unless otherwise noted. If failure did not occur by 10,000 minutes, the test was discontinued.

EXAMPLE 1

Various materials were tested according to the test methods outlined above for Peak Load and Percent Recovery. The strips are described and test results are presented in Table 1.

TABLE 1

| Strip | Strip Material | Resin of Commercial Product | Peak Load kg/cm | % Recovery |
|---|---|---|---|---|
| 1 | 0.12 mm extruded blue semi-transparent PE film | PETROTHENE NA 960-00[1] resin extruded with 3 wt-% Remafin Blue AEW U-18[2] pigment | 1.69 (Average of 10) | 77.6 (Average of 20) |
| 2 | 0.102 mm extruded clear embossed PE film | PETROTHENE NA 964-085[1] resin | 0.9 | 70.1 |
| 3 | 0.095 mm extruded blue semi-transparent PE film | PETROTHENE NA 964-085[1] resin extruded with 4 wt-% Remafin Blue AEW U-18[2] pigment | 0.82 (Average of 10) | 70.5 (Average of 20) |
| 4 | 0.073 mm extruded blue semi-transparent PE film | PETROTHENE NA 964-085[1] resin extruded with 4 wt-% Remafin Blue AEW U-18[2] pigment | 0.572 | 53.0 |
| 5 | 0.12 mm extruded blue semi-transparent PE film | PETROTHENE NA 964-085[1] resin extruded with 4 wt-% Remafin Blue AEW U-18[2] pigment | 1.00 | 58.3 |
| 6 | 0.2 mm extruded white PE film | PETROTHENE NA 964-085[1] resin extruded with 5 wt-% Spectratech CM 80582[3] | 2.3 | 81.9 |
| 7 | 0.15 mm clear urethane film | 3M Polyurethane Protective Tape SJ8675 without liner[6] | 1.4 | 98.4 |
| 8 | 0.023 mm white pigmented polyester film | Melinex 329/92[3] Film | 3.6 | 25.5 |
| 9 | 0.05 mm extruded clear embossed PE film | PETROTHENE NA 964-085[1] Resin | 0.95 | 66.8 |
| 10 | 0.10 mm extruded and calendered green plasticized PVC film | plasticized PVC resin | 2.6 | 43.8 |
| 11 | 0.05 mm clear BOPP film | Treax TX 200-0 Clear Film[4] | 5.83 | 35.6 |
| 12 | 0.04 mm extruded vinyl film | 1.6 mil Clear Vinyl Gloss/Matte Film RV407[3] | 2.85 | 0.0 (sample broke) |
| 13 | 0.1 mm extruded clear PE film | GF-10 Film[7] | 1.53 | 62.9 |

[1] Quantum Chemical Corp., Cincinnati, OH
[2] Resco Colors, a subsidiary of Hoechst Canada Inc., Mississauga, Ontario, Canada
[3] ICI Films, Wilmington, DE
[4] Toray Plastics America Inc., North Kingstown, RI
[5] Borden Inc., Columbus, OH
[6] Minnesota Mining and Manufacturing Co., St. Paul, MN
[7] Consolidated Thermoplastics Company

EXAMPLE 2

A 0.25 mm thick layer of pressure sensitive adhesive prepared generally according to Example 10 in U.S. Pat. No. 5,342,685 was coated onto a two-sided silicone-coated release paper liner. The adhesive-coated release liner was hand laminated to a 0.1 mm extruded clear low density polyethylene film prepared from PETROTHENE NA 964-085 resin obtained from Quantum Chemical Corp., Cincinnati, Ohio (backing strip 2 in Table 1). The coated film was cut into 2.5 cm×2.5 cm squares.

The adhesive composition included 19.8 wt-% KRATON 1118 rubber available from Shell Chemical Co., Houston, Tex., 20.8 wt-% SOLPRENE 1205 rubber, available from Housemex, Inc., Houston, Tex., 48.3 wt-% PICCOLYTE A135 resin, available from Hercules, Inc., Brunswick, Ga., 10.1 wt-% SHELLFLEX 371 oil, available from Shell Chemical Co., Houston, Tex., and 1.0 wt-% IRGANOX 1076 antioxidant, available from Ciba Geigy, Mcintosh, Tex.

The patch was applied as a field repair to a 700 mm×25 mm diameter touring bicycle inner tube to a puncture having an approximate size of 0.375 inches (9.5 mm). The tube was toughened with sandpaper before applying the patch using hand pressure. The inner tube was inserted in the tire and was inflated to about 690 kilopascals. The patch has not failed during 3 months of use.

EXAMPLE 3

A test device was constructed to compare bond strength of pressure sensitive patches to inner tube surfaces while in an air expanded mode. This device had a 3.8 cm deep×10.2 cm diameter cavity machined into a 5.1 cm deep×15.2 cm diameter aluminum cylinder. A 0.32 cm thick aluminum ring of 10.2 cm inside diameter and 15.2 cm outside diameter dimension was used as a retaining ring to hold 12.7 cm diameter rubber inner tube samples. An air inlet tube with an open/close valve and air gauge was attached to a hole in the wall which allowed air to be injected into and held in the cylinder.

Four patches were compared using this fixture. The purpose was to determine the patch's ability to seal air in the cylinder after pressurization. The patches are described as follows:

1—The patch of this invention Example 2.

2—A 2.54 cm×2.54 cm patch with 90° corners 0.15 cm thick constructed of a white polyethylene foam and a layer of pressure sensitive adhesive sold under a brand name of SPEED PATCH, available from Speed Patch, San Juan Capistrano, Calif.

3—A 2.2 cm diameter patch constructed of about a 0.81 mm thick black rubber (believed to be neoprene) with about a 0.076 mm thick layer of pressure sensitive adhesive sold under a brand name of QUICK FIX, available from Innovations in Cycling, Tucson, Ariz.

4—A 2.54 cm diameter blue polyethylene foam with a layer of pressure sensitive adhesive sold under the brand name of the LEECH, commercially available in Europe.

To determine the ability of the above four patches to prevent air from escaping from the pressurized chamber, a 12.7 cm diameter disc was cut from an inner robe. Four punctures were made in the rubber disc with a 1.14 mm diameter pin. Surface preparation of the puncture area was accomplished according to the instructions contained in each commercial package. Patches #1, 2, and 4 required abrading the punctured area with an abrasion material provided with each package of patches. Patch #3 required cleaning the puncture area with an alcohol prep pad provided with the patch package.

A patch of each type was placed over one of the four punctures. An applied static pressure of 23 kg was placed on each patch area for 15 seconds using a hand operated pressure applicator with a Chatillon force gauge. The rubber disc was clamped between the open end of the aluminum vessel and the 3.18 mm thick aluminum washer shaped top ring. The sealed device was then slowly inflated to about 55 kPa. This pressure caused the rubber disc to balloon and form a shape similar to about 80% of a sphere. The inflated device was submerged in water to detect air leakage and the following was observed:

Patch #3 failed immediately. The PSA bonded better to the butyl rubber tube material than to the rubber patch. The adhesive layer transferred from the patch to the tube allowing the patch to fall away and allow air to escape.

Patch #2 also failed immediately. The corners of patch lifted and peeled away from the tube. Air escaped at each of the four corner areas and not through the thickness of the patch.

In a first test of all four patches, patches #1 and #4 did not fail; however, air pressure drop caused by failures of patches 2 and 3 curtailed the test. In a second test of patches #1 and #4 only, patch #4 failed immediately as the PSA lifted from the tube surface. In a third test of patch #1 only, failure occurred as a result of air escaping along the channels and cuts made by abrading the surface of the tube with too much pressure. The PSA did not fail or lift from the surface, however. A fourth test of patch #1 on a puncture area that had been cleaned by wiping with a dry cloth did not fail.

Three other patches were tested using this fixture. The patches are described as follows:

5—A 0.25 mm thick layer of pressure sensitive adhesive from Example 2 was laminated to a non-stretchable 0.051 mm thick primed polyester film backing. A 25.4 mm×25.4 mm square sample with rounded corners was cut out. The sample was tested the same as Example 3. The sample adhered to the rubber, but started to peel around the edges within 10 minutes of inflation at 55 kPa. This example represents the importance of using an elastic backing in an unconstrained application.

6—A non-stretchable 25.4 mm×25.4 mm square sample of 3M SCOTCH brand transparent film tape #622 with rounded corners was tested the same as Example 3. The sample started to fail within the first minute of inflation by peeling around the edges, and failed completely within 8 minutes.

7—A 0.13 mm thick sample of 3M brand F-9465 PC Adhesive transfer tape was laminated to stretchable 0.15 mm clear urethane film (Strip #7 of Table 1). This sample was designed specifically for patching flexible vinyl products. A 25.4 mm×25.4 mm square sample patch with rounded corners was cut out. The patch was tested on a 0.38 mm thick clear flexible vinyl film according to the procedure of Example 3. The adhesive patch adhered very well to the vinyl film. The patch performed for 24 hours at a pressure of 55 kPa without failing.

EXAMPLE 4

90° peel strength to stainless steel and low density polyethylene, T-Peel strength to a bicycle inner tube, and 70° C. static shear tests were run to determine the adhesive performance properties of several adhesives. The effect of adhesive thickness was also measured.

The tackified acrylate adhesive was prepared as follows: A composition was prepared by mixing 82 parts isooctyl acrylate (IOA), 17 parts isobornyl acrylate (IBA), 1 part acrylic acid (AA), and 0.04 pph benzil dimethyl ketal photoinitiator (Escacure™KB-1 available from Sartomer Co.) in a closed glass container. The container was purged with nitrogen, and as the nitrogen purging continued, the composition was irradiated with an ultraviolet black light (GE F15T8 BL from General Electric Co.) which was partially taped with black tape to provide an intensity of about 0.15 milliwatts per square centimeter ($mW/cm^2$), measured according to the industry standard G unit, to form a syrup having a coatable viscosity estimated to be about 3000 centipoise. To the syrup was added 1 pph chlorinated polyolefin (CP343-1 available from Eastman Chemical Co.), 15 pph hydrocarbon tackifier (REGALREZ™ 6108), an additional 0.16 part benzil dimethyl ketal, and 0.14 pph 2,4-bis(trichloromethyl)-6-(4-methyoxyphenyl)-s-triazine and the mixture was heated at about 65° C. for about 1 hour and mixed on a roller while it cooled to room temperature to form a stable, slightly hazy syrup. After mixing, the mixture was knife coated to a thickness of about 0.25 mm onto a paper release liner that had been coated with a silicone release coating, and then exposed to fluorescent black lamps in a nitrogen rich atmosphere (50–100 ppm oxygen) for 5 minutes to form a pressure-sensitive adhesive transfer tape. The intensity was 1.7 milliWatts/square centimeter ($mW/cm^2$) for 1.7 minutes and 4.2 $mW/cm^2$ for 3.3 minutes, measured according to the National Institute Standards units (NIST units). The fluorescent black lamps had about 90% of their emission spectra between about 300 and 400 nanometers (nm), with a peak emission at about 350 nm.

The complete disclosures of all patents, patent documents, and publications listed herein are incorporated by reference. The foregoing detailed description and examples have been given for clarity of understanding only. No unnecessary limitations are to be understood therefrom. Thus, the invention is not limited to the exact details shown and described, for variations obvious to one skilled in the art will be included within the invention defined by the claims.

What is claimed is:

1. A patch comprising:
   (a) a backing; and
   (b) a pressure sensitive adhesive layer having an average thickness of greater than about 0.076 mm disposed on said backing;
   said patch having a maximum thickness of no greater than about 0.64 mm, a T-Peel strength from an organic polymeric substrate of greater than about 0.18 kN/m after 1 hour dwell time at 22° C., and a static shear strength of at least about 50 minutes from stainless steel at 70° C. with a 7.6 kPa load.

2. The patch of claim 1 wherein said backing has a maximum thickness of no greater than about 0.40 mm.

3. The patch of claim 2 wherein said pressure sensitive adhesive layer has a thickness of at least about 0.089 mm.

4. The patch of claim 1 wherein said backing has a maximum thickness no greater than about 0.30 mm.

5. The patch of claim 1 wherein said backing has a maximum thickness of no greater than about 0.10 mm.

6. The patch of claim 1 wherein said pressure sensitive adhesive layer has an average thickness of at least about 0.089 mm.

7. The patch of claim 1 wherein said pressure sensitive adhesive layer has an average thickness of at least about 0.10 mm.

8. The patch of claim 1 wherein said backing comprises an elastic polymeric material.

9. The patch of claim 8 wherein said elastic polymeric material has at least about 50% recovery after being elongated to 100% of its original length.

10. The patch of claim 9 wherein said elastic polymeric material is selected from the group consisting of a polyolefin and a polyurethane.

TABLE 2

| Adhesive | Thickness (mm) | 90° Peel on Stainless Steel (kN/m) Avg. | T-Peel (kN/m) Avg. | 90° Peel on Polyethylene (kN/m) Avg. | 70° C. (min.) Static Shear |
| --- | --- | --- | --- | --- | --- |
| 1 | 0.127 | 3.22 | 0.95 | 1.73 | 293 |
| 1 | 0.254 | 3.99 | 1.16 | 2.19 | 108 |
| 2 | 0.051 | 1.28 | 0.42 | 0.77 | 4,390 |
| 2 | 0.127 | 2.22 | 0.53 | 1.24 | 1,867 |
| 2 | 0.254 | 3.12 | 0.74 | 1.77 | 826 |
| 3 | 0.0584 | 0.60 | 0.30 | 0.54 | 977* |
| 4 | 0.127 | 0.91 | 0.18 | 0.11 | 4,923** |
| 5 | 0.066 | 1.28 | 0.49 | 0.95 | 315* |
| 6 | 0.254 | 1.42 | 0.46 | 0.46 | 10,000 |

1: Adhesive from Example 2.
2: Adhesive of Example 17 from U.S. Pat. No. 5,342,685.
3: 3M SCOTCH brand glass filament tape 898 from Minnesota Mining and Manufacturing Company (3M), a natural rubber based on PSA - tested on its own backing.
4: 3M brand F-9465PC adhesive transfer tape available from 3M.
5: 3M SCOTCH brand transparent film tape 622 from 3M - tested on its own backing.
6: Tackified Acrylate as prepared above.
*One sample.
**Average of two samples.

11. The patch of claim 10 wherein said elastic polymeric material is a polyolefin selected from the group consisting of a linear low density polyethylene, an ultra low density polyethylene, and a low density polyethylene.

12. The patch of claim 1 wherein said pressure sensitive adhesive is selected from the group consisting of an acrylate, a natural or synthetic rubber, a silicone-based adhesive, a polyolefin, a polyester, a polyamide, and a polyurethane.

13. The patch of claim 12 wherein said pressure sensitive adhesive comprises a block copolymer.

14. The patch of claim 12 wherein said pressure sensitive adhesive comprises a styrene-butadiene-styrene block copolymer.

15. A method of repairing an article comprising applying a patch to a defect in the article, wherein said patch comprises:
   (a) a backing; and
   (b) a pressure sensitive adhesive layer having an average thickness of greater than about 0.076 mm disposed on said backing;
   said patch having a maximum thickness of no greater than about 0.64 mm, a T-Peel strength from an organic polymeric substrate of greater than about 0.18 kN/m after 1 hour dwell time at 22° C., and a static shear strength of at least about 50 minutes from stainless steel at 70° C. with a 7.6 kPa load.

* * * * *